UNITED STATES PATENT OFFICE.

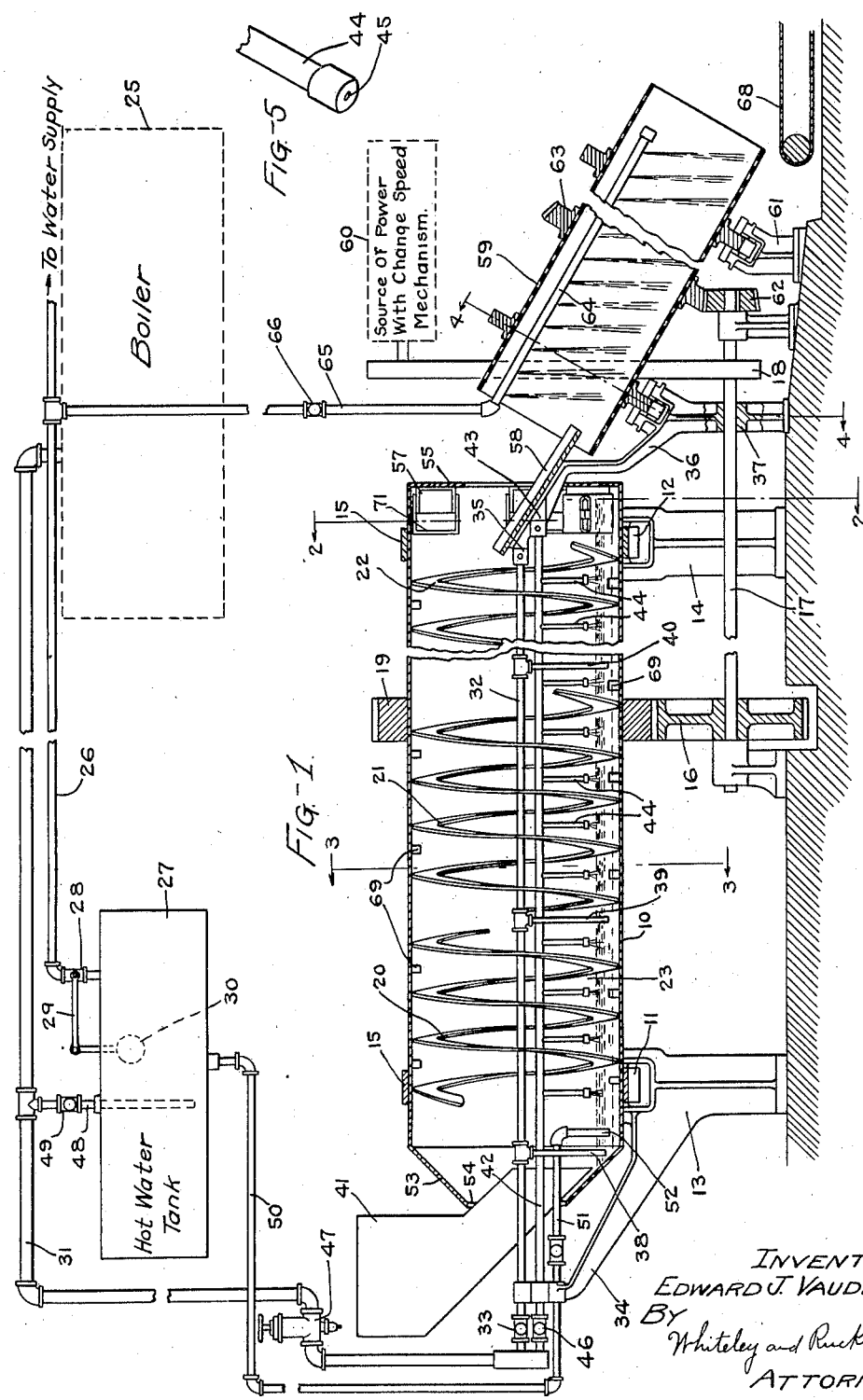

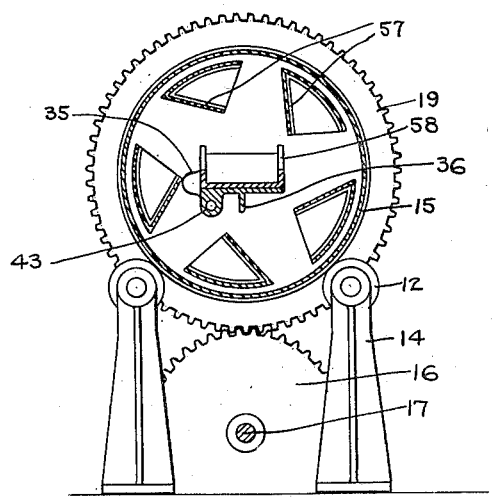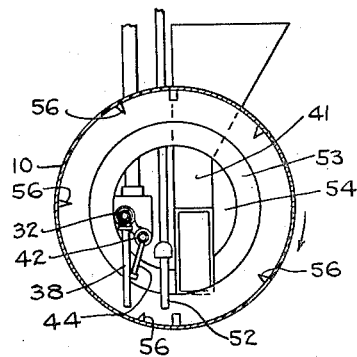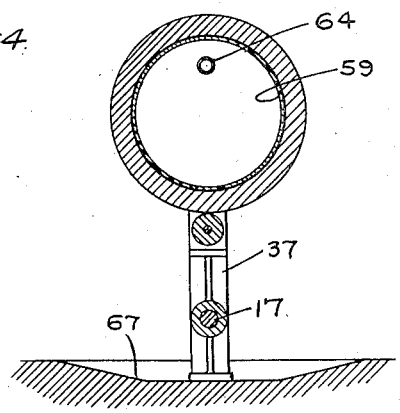

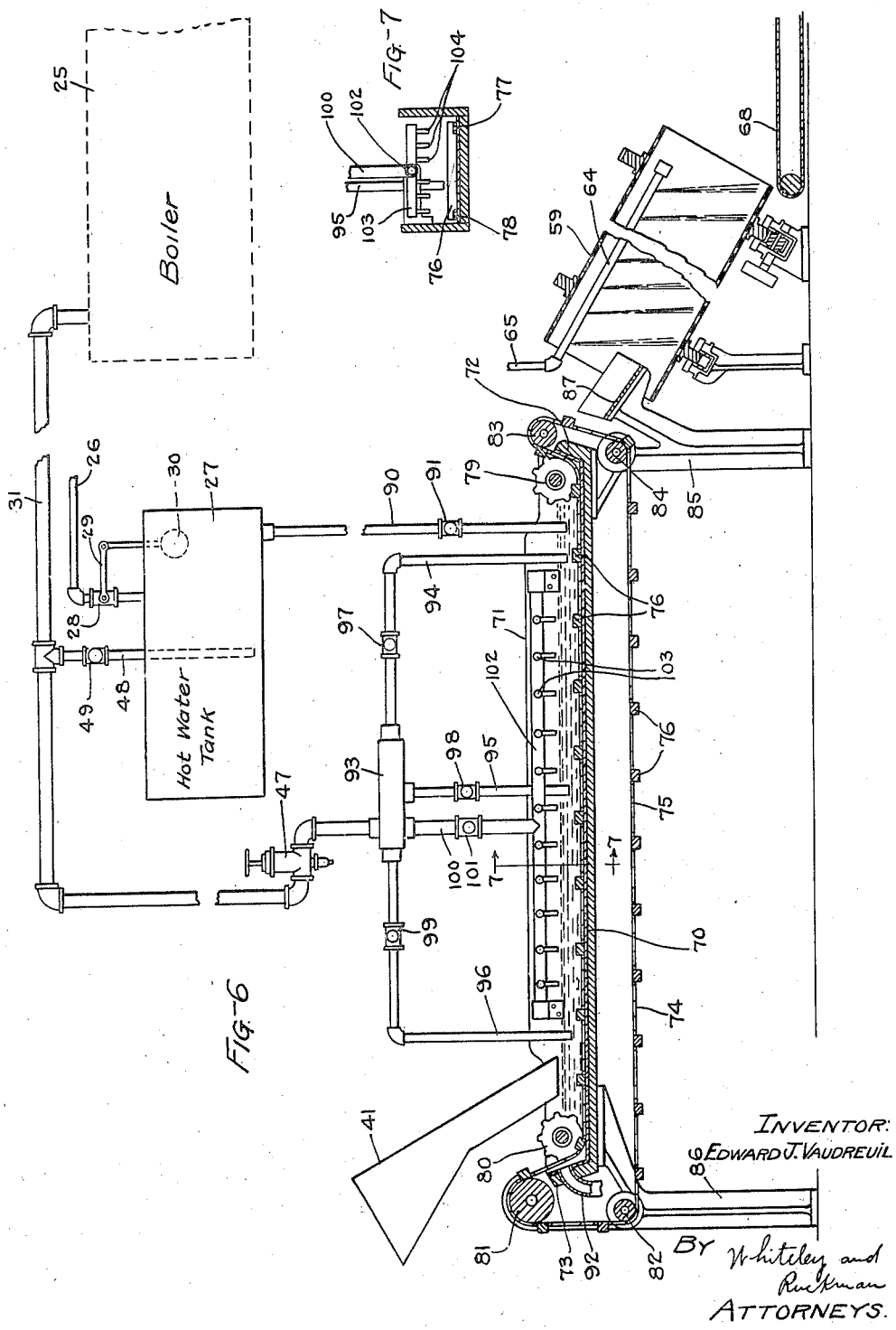

EDWARD J. VAUDREUIL, OF EAU CLAIRE, WISCONSIN.

PROCESS OF BLANCHING OR COOKING VEGETABLES.

1,374,341. Specification of Letters Patent. Patented Apr. 12, 1921.

Application filed February 23, 1921. Serial No. 446,992.

*To all whom it may concern:*

Be it known that I, EDWARD J. VAUDREUIL, a citizen of the United States, residing at Eau Claire, in the county of Eau Claire and State of Wisconsin, have invented certain new and useful Improvements in Processes of Blanching or Cooking Vegetables, of which the following is a specification.

My invention relates to a process of blanching or cooking vegetables such as peas, beans for baked beans, string beans, etc. This blanching or cooking is an essential step in the preparation of such vegetables for canning. In canneries where such cooking or blanching takes place on a large scale great difficulty has been experienced in obtaining blanching results with sufficient capacity and effective cooking and at the same time not contaminating the vegetables. As now practised such contamination invariably takes place for the reason that the hot water in which the vegetables are cooked or blanched becomes foul with the juices and loose detritus of the vegetables. The vegetables in cooking swell and absorb a certain percentage of the water in which they are cooked. If this water is in any respect foul it will enter the body of the vegetables and contaminate them and materially degrade the flavor and quality of the product. In canning peas it has long been customary to attempt to overcome the ill effect of this bad flavor by the use of sugar. This results in the canned product having an entirely different flavor from the natural flavor and in its being not only less palatable but much less wholesome. It is also true that the methods heretofore employed wherein quantities of the product in succession are passed through the same large body of water, have limited the capacity and produced inefficient cooking for the reason that nothing but water has been used in the cooking, which never could be at a higher temperature than the boiling temperature, and for this reason the time required to effect complete and satisfactory cooking is much longer than is necessary with my apparatus, and consequently the amount of vegetables that can be properly cooked in a given time will be less. Furthermore, by the use of live steam under pressure directly impacted upon the vegetables as they travel through the apparatus I am not only enabled to cook the vegetables in less time than by the strictly boiling process, but effect a cooking action which is superior in its results on the product to that which may be obtained by the use of boiling water alone.

It is the object of my invention to effect a series of steps or acts coacting to effect a cooking operation on vegetables which at the same time will overcome the objections and accomplish the desirable results above enumerated. Another object of my invention is to develop a process of cooking vegetables which on the one hand will have large capacity in continuous operation sufficient to be practicably effective in the larger canning operations, and at the same time by the use of steam under pressure impacted directly upon the vegetables or upon the vegetables in a small body of hot water kept at the boiling point, which body is changed in proportion to the introduction of vegetables into it and in relation to the time required for such vegetables to be cooked, to accomplish such cooking in a relatively shortened time and thereby to increase the productive capacity of any apparatus employed for carrying out my process, to effect a more perfect cooking so that the quality of the resultant product is improved by the cooking action itself, and to maintain the water in contact with the vegetables as they are cooked clean and pure so that the vegetables absorb nothing but clean and pure water, and hence are not contaminated, the entire process tending to cause the vegetables to retain the natural palatable flavor of the vegetables.

More specifically, my invention consists in spreading the vegetables in a relatively thin mass and moving them continuously in that mass subject to the action of steam impacted at high pressure into and upon the vegetables, and preferably in a moving stream of hot water forming a relatively extended and shallow body, and maintaining the movement of said water and the temperature at the boiling point while in movement, either within or without a cooking chamber, by adding boiling water at one end of said stream and discharging it at the other end at a rate proportional to the amount of vegetables in and passing through said stream of water, and proportional to the total time which said vegetables must be in said water to be properly cooked, and subjecting the water and the vegetables to the action of live steam from a source of steam under pressure, which pressure is regulated to effect the most efficient cooking action in a minimum period of time; and of introducing said vegetables at one end of the stream of water, and agitating the vegetables of the mass and moving them along and in said stream, subject at a multiplicity of points in said stream to the action of such pressure steam, at such a rate that they will reach the end of the stream in a predetermined time just sufficient properly to cook the vegetables, and thereafter withdrawing the vegetables from the mass and from the stream of water at the other end thereof and at the end of said period.

The full objects and advantages of my invention will appear in connection with the detailed description thereof, and the novel features embodied in my inventive idea will be particularly pointed out in the claims.

In the drawings appended, which illustrate certain forms of apparatus for practising the various steps of my process,—

Figure 1 is a side elevation part sectional view of one form of apparatus with some parts represented diagrammatically for carrying out the various steps of my process. Fig. 2 is a sectional elevation view on the line 2—2 of Fig. 1. Fig. 3 is a transverse sectional elevation view taken on line 3—3 of Fig. 1. Fig. 4 is a sectional view on line 4—4 of Fig. 1. Fig. 5 is a fragmentary view of a portion of a nozzle showing the outlet for the steam blasts. Fig. 6 is a sectional elevation view partly diagrammatic of an alternative form of apparatus for carrying out the process of my invention. Fig. 7 is a sectional view on line 7—7 of Fig. 1.

In the form of apparatus for practising my process illustrated in Figs. 1 to 5, inclusive, of the drawings, a drum 10 of sheet metal or wood, or any desired material is maintained in a horizontal position by resting upon rollers 11, 12 journaled in front frame members 13 and rear frame members 14, said rollers engaging rings or bands 15 upon the drum 10. It will be understood that any form of cylinder and any suitable frame device and system of rollers or other means of supporting the drum horizontally for rotary movement may be employed and are within the scope of my invention. For giving the drum or cylinder the desired rotary movement a pinion 16 on a shaft 17 driven by a pulley 18 from any desired source of power may mesh with a spur gear 19 encircling the drum 10, it being understood that the source of power indicated diagrammatically at 60 is provided with change speed mechanism of any well-known type whereby the rate of rotation of the drum 10 may be regulated in any way desired to cause the rotation of the drum to be at a rate just sufficient to carry vegetables and water through the drum and discharge the same after complete cooking has been effected.

Within the drum 10 are a series (here shown as three) of spiral ribs or fins 20, 21, 22 which form a substantially continuous spiral passageway 23 and operate at the bottom of the drum to forward vegetables, or vegetables and water, along said bottom as said vegetables are fed into the drum from the hopper chute 24 at the rear or feed end of the drum. A hot water tank 27 receives water from any suitable source of supply through a pipe 26, the amount of water in the tank being automatically controlled by valve 28, which is operated by an arm 29 actuated by a float 30 within the tank 27 in a well-known way.

This water is heated to boiling by steam from a boiler indicated diagrammatically at 25, which passes from said boiler through a main feed pipe 31 and a branch pipe 32 which is controlled by hand valve 33. The branch pipe 32 extends through the cylinder or drum 10 below and at the side of the cylinder toward which the bottom of said cylinder moves, said pipe 32 being supported at one end by a bracket 34 secured to the supporting standard 13, and at the other end by a boss 35 on a bracket 36 secured to a support 37 hereinafter referred to. The pipe 32 is provided with a plurality of depending leads (here shown as three) 38, 39, 40, which leads extend to points near the bottom of cylinder or drum 10, where live steam at any desired pressure will be injected directly into the vegetables at the bottom of drum 10 and into the shallow body of water moving along the bottom of said drum where water is employed. The lead 38 enters the water at the point where the vegetables are passed into the cylinder from hopper 41 so that said vegetables are immediately subjected to the action of the live pressure steam. In addition to effecting a cooking action upon the vegetables the steam from the leads 39, 40 and 41 keeps the water in the tanks at or near boiling temperature. A second lead 42 extends from steam main 31 through the drum 10, being supported by bracket 34 and a boss 43 on bracket 36. The lead or pipe 42 is provided with a multiplicity of extension pipes or nozzles 44 each having a central aperture 45, as indicated in Fig. 5. The flow of steam through pipe 42 is controlled by hand valve 46. The nozzles 44 are angularly disposed toward that side of the cylinder 10 which from the direction of rotation thereof is the rising side and tends to bring the vegetables to the surface or out of the water which may be in the drum, or to raise the vegetables along the side of the drum. In this manner jets of steam from the nozzles 44 are at desired pressures impacted directly into the exposed vegetables. The delivery pressure of steam from leads 38, 39 and 40, and nozzles 44, is determined by a steam reducing valve 47 placed at a suitable point in the main steam line 31. By this means any pressure not greater than the maximum pressure of the boiler may be obtained. It has been found by experiment that the higher the delivery pressure of the steam the less will be the time required to cook the vegetables, or, stated in other words, a higher steam pressure will make possible increase of the speed of rotation of the drum 10 and an increased rate of movement of the product through the drum and increased capacity. I have found by experiment that where the steam is delivered at thirty pounds pressure twenty minutes will be required for cooking. At forty pounds pressure from fifteen to seventeen minutes will be required. At fifty pounds pressure from ten to twelve minutes will be required. Pressures ranging from thirty to fifty pounds are desirable according to the type of vegetable which is being cooked.

The water in tank 27 is kept at boiling temperature by steam which goes from main 31 through a pipe 48 to the bottom of tank 27, being controlled by a hand valve 49. The hot water from tank 27 goes through pipe 50 and an extension 51 therefrom into the drum 10, where a depending leader 52 introduces the water into the cylinder at about the point where the vegetables are introduced into the cylinder from the chute or hopper 41. It is to be noted that the rear end of the cylinder has a conical closure 53 which partly closes the cylinder, leaving a reduced opening 54 through which the chute 41 and steam and water pipes extend. A right-angled flange 55 at the front of the cylinder 10, together with the conical flange 53 maintains the water within the cylinder except as the same is discharged as hereinafter pointed out. The feed of water relative to the rate of rotation of the drum 10, and rate of discharge, will be such as to maintain the water at all times at a slightly lower level than the vertical height of the spiral fins 20, 21 and 22. It will be seen that the boiling water may be fed in any desired quantity continuously into the receiving end of the tank at about the point that the vegetables come in through the chute 41. Fins 20, 21 and 22 are provided with a multiplicity of narrow slit-like openings 56 adjacent the inside wall of the cylinder by which the water introduced in the cylinder may flow continuously in a stream, said openings being of a form and size such as to prevent the passage of vegetables which are constrained to move through the cylinder to the discharge end by the action of the ribs 20, 21, and 22 in a predetermined time just sufficient to produce the desired cooking action before discharge. This is effected, of course, by regulating the speed of rotation of the cylinder in reference to the rate of feed of vegetables and the pressure at which the steam is delivered to the vegetables.

When the vegetables reach the forward or discharge end of the drum 10 they are engaged by buckets 57 secured to said discharge end and inside of the flange 55 on said discharge end. Said buckets take a measured quantity of vegetables and water and discharge the same upon a trough or chute 58 which extends through the central opening within the flange 55, and which is supported upon an extension of bracket member 36. The chute 58 leads inside of a perforate drum 59, which drum is rotatably supported upon the standard 37 and a second standard 61 and is driven by a pinion 62 on shaft 17 which meshes with a gear 63 on the drum 59. Cold water is sprayed from a pipe 64 within drum 59, being supplied by a branch pipe 65 extending from pipe 26 and controlled by a hand valve 66. This cold water together with the water discharged from the buckets 36 passes through the perforate drum 59 and upon a drainage surface below the same, indicated at 67 in Fig. 4, from whence said water goes out of the building to the sewer or other drainage channel. The vegetables are finally discharged from drum 59 upon an endless conveyer belt 68, from which they are fed to any desired point for a continuance of the canning operation.

Upon the inside of cylinder 10 and positioned midway of the spiral passageway 23 are a multiplicity of pins or projections 69, which pins or projections coöperate to agitate or stir the vegetables as the pins pass through the mass of vegetables at the bottom of the drum. These vegetables will also, as hereinbefore pointed out, tend to be lifted by the rotation of the drum, and will be subject to the steam blown upon them both directly into them by the leads 38, 39 and 40 and impacted against them from the nozzles 44. It is noted that the lead 38 enters the drum and the vegetables at the point where said vegetables are introduced into the cylinder, quickly heating them to the desired point and preventing cooling of the water where that is used. The leads 39 and 40 extend between the spiral fins 20 and 21, and 21 and 22, respectively, so that the rotation of said fins is not interfered with. The ends of nozzles 44 are brought as close to the vegetables at the bottom of the drum as the height of the fins will permit.

It is to be noted that the buckets 57 preferably are provided with a telescoping portion 71 shown in Fig. 1 with a set-bolt 72 operating in a slide 73 to hold said buckets in adjusted position whereby they may be larger or smaller and discharge a greater or less amount of the cooked vegetables and water as may be desired.

A different form of apparatus for effecting the steps of my process is shown in Figs. 6 and 7. In this form of invention the hopper 41 for introducing or feeding the vegetables, the cylinder 59, belt 68 and operative means for discharging the vegetables, hot water tank 27, steam boiler 25, water supply pipes 26, 64, 65, hot water control means 28, 29, 30, main steam supply pipe 31, steam-reducing valve 47 and hot water heating steam pipes 48, 49 are, or may be, in all respects similar to the corresponding devices shown and described in connection with Figs. 1 to 5, inclusive. In place of the cylinder or drum 10 a trough 70 is provided, open at the top, having side walls 71 and front and rear end walls 72, 73, respectively. An endless conveyer 74 comprising a belt 75 and transverse slats 76 secured thereto has sprocket chains 77, 78 which are actuated by sprocket wheels 79, 80, the conveyer belt running over and around rear rollers 81, 82 and front rollers 83, 84, all being supported upon front and rear frame members 85, 86. By these means the belt is caused to travel along the bottom of the trough 70 at such speed as may be desired, the vegetables being fed into said trough through chute 41 at such a rate as to produce an extended sheet of said vegetables in the bottom of said trough and upon the conveyer 74, the vegetables being discharged by said belt over the roller 83 and upon a chute 87 which conveys them into the separating drum 59.

Hot water is delivered in desired quantities through a pipe 90 controlled by a valve 91 to the front or discharge end of the trough, and is discharged from the rear or receiving end of the trough through a pipe 92. Steam from pipe 31 goes into a header 93. From this header pipes 94, 95, 96, each controlled by hand valves 97, 98, 99, are adapted to carry the live pressure steam upon the mass of vegetables on the conveyer belt 74 and into the stream of water moving over said conveyer belt in a direction opposite that of the motion of the belt.

From the header 93 a fourth pipe 100, controlled by a hand valve 101, communicates with a longitudinal pipe 102 which is provided with a multiplicity of transverse horizontal pipes 103, as clearly shown in Figs. 6 and 7. The pipes 103 are each provided with a multiplicity of steam nozzles 104 which approach close to the surface of the water in the trough 10 or of the moving mass of vegetables on the conveyer 74.

It will be apparent that by these means the various steps of my process are practised in the apparatus of Figs. 6 and 7 so as to comprise the same series of acts effecting the same desired result, but with apparatus markedly different from that shown in Figs. 1 to 5.

The advantages which follow the practice of my process, no matter what form of apparatus for carrying out the process may be employed, will be apparent from the foregoing description. The process is of a character which permits the operation upon vegetables on a very large scale for a relatively small extent of apparatus. That is, there is large capacity. The steps of the process are further subject to individual and coöperative variation in degree to adapt the process particularly to the type of vegetable and the condition of that vegetable which is being cooked, the variations being in steam pressures, in rate of feed, in rate of movement of the sheet of vegetables, in proportionate supply of water, all to produce maximum capacity and efficiency. At the same time the vegetables are continually acted upon by fresh, uncontaminated steam, and, in the preferred practice of the process, by clean sweet uncontaminated water which is provided boiling hot in proportion to the amount of vegetables being treated, and is discharged from the main body at a corresponding rate, is maintained at or about the boiling temperature by live steam under pressure; which additionally directly effects the cooking of the vegetables, so that the vegetables are always subject to the action of pure water and steam and the water absorbed cannot contaminate or deteriorate the product, and the flavor and quality of the product will tend to be that which nature has given it.

I claim:

1. The process of cooking vegetables or the like for canning, which consists in causing a relatively shallow body of hot water to move longitudinally so that the entire extent of said water will pass from one end thereof to the other end in a predetermined period of time, introducing hot water at one end and discharging it from the other end of said shallow body to maintain the same constant, introducing vegetables into said body at or near the point where the hot water is introduced in an amount proportional to the amount of hot water so introduced, and moving said vegetables with the body of hot water and discharging the vegetables with the hot water, said period of time from the introduction of vegetables and hot water to the discharge thereof being just sufficient properly to cook the vegetables.

2. The process of cooking vegetables, or the like, for canning, which consists in providing a relatively extended and shallow body of hot water, introducing said vegetables at one end of said body, causing said vegetables to move in and along said body of hot water to the other end thereof in a predetermined period of time sufficient to cook said vegetables, maintaining the temperature of all the water in said body at or near the boiling point throughout said period, discharging the vegetables from the body of water at the end of said period, and introducing hot water at one end and discharging it from the other end of said body at a rate proportional to the quantity of said vegetables in and subject to the cooking action of said body of water.

3. The process of cooking vegetables or the like for canning, which consists in delivering the vegetables at one point and discharging them at a point separated therefrom, continuously moving the vegetables from the receiving point to the discharge point at a substantially constant rate of speed so that said vegetables are maintained in a relatively thin mass and are caused to travel from the receiving point to the discharge point in a predetermined time just sufficient for proper cooking of the vegetables, and subjecting said vegetables to the action of live steam discharged under pressure directly upon and into said vegetables at a number of separated points along the extent of their travel.

4. The process of cooking vegetables or the like for canning, which consists in delivering the vegetables at one point and discharging them at a point separated therefrom, continuously moving the vegetables from the receiving point to the discharge point at a substantially constant rate of speed so that said vegetables are maintained in a relatively thin mass and are caused to travel from the receiving point to the discharge point in a predetermined time, subjecting said vegetables to the action of live steam discharged under pressure directly upon and into said vegetables at a number of separated points along the extent of their travel, and relatively regulating the delivery pressure of the steam and the rate of movement of the sheet of vegetables so that complete cooking of said vegetables is effected when they reach their point of discharge from the mass.

5. The process of cooking vegetables or the like for canning, which consists in delivering the vegetables at one point and discharging them at a point separated therefrom, continuously moving the vegetables from the receiving point to the discharge point at a substantially constant rate of speed so that said vegetables are maintained in a relatively thin mass and are caused to travel from the receiving point to the discharge point in a predetermined time just sufficient for proper cooking of the vegetables, agitating the vegetables in said mass as they are moved, and subjecting said vegetables while so agitated to the action of live steam discharged under pressure directly upon and into said vegetables at a number of separated points along the extent of their travel.

6. The process of cooking vegetables or the like for canning, which consists in providing a relatively extended shallow body of hot water, introducing said vegetables at one end and discharging them at the other end of said body, continuously moving the vegetables from the point of introduction to the discharge point at a substantially constant rate of speed so that said vegetables are caused to travel in a relatively thin mass in the body of water from the receiving point to the discharge point in a predetermined time just sufficient for proper cooking of the vegetables, and injecting live steam discharged under pressure into said body of water and upon and into said vegetables at a number of separated points along said body of water.

7. The process of cooking vegetables or the like for canning, which consists in providing a relatively extended shallow body of hot water, introducing said vegetables at one end and discharging them at the other end of said body, continuously moving the vegetables from the point of introduction to the discharge point at a substantially constant rate of speed so that said vegetables are caused to travel in a relatively thin mass in the body of water from the receiving point to the discharge point in a predetermined time just sufficient for proper cooking of the vegetables, introducing hot water at one end and discharging it from the other end of said body at a rate proportional to the quantity of vegetables in said body of water, and injecting live steam discharged under pressure into said body of water and upon and into said vegetables at a number of separated points along said body of water.

8. The process of cooking vegetables or the like for canning, which consists in delivering hot water at one point and discharging water at a point removed therefrom so as to produce a slow moving stream of water of a depth and bulk and subject to change at a rate proportional to the amount of vegetables in said stream, maintaining the temperature of said water throughout the extent of the stream at or near the boiling point, introducing said vegetables at one end of said stream, causing said vegetables to move along said stream to the other end thereof in a predetermined period of time sufficient to cook said vegetables, and separating said vegetables from said other end of the stream.

9. The process of cooking vegetables and the like for canning, which consists in providing an extended cooking chamber closed except on the ends having a relatively extended and shallow body of hot water therein, introducing hot water at one end and discharging it from the other end of said body at a rate such that the body of water will be entirely changed in a predetermined period of time, injecting live steam under pressure into said body of water at a number of points along the same to effect heating of the water and proper cooking of the vegetables, introducing said vegetables into the body of water at one end, causing the vegetables to move in and to the other end of said body of water in the same period of time in which change of the body of water is effected, and separating said vegetables from the body of water and discharging them from the other end of the chamber at the end of said period.

In testimony whereof I hereunto affix my signature.

EDWARD J. VAUDREUIL.